United States Patent
Jang et al.

(10) Patent No.: US 11,377,556 B2
(45) Date of Patent: Jul. 5, 2022

(54) POLYIMIDE-BASED BLOCK COPOLYMER AND POLYIMIDE-BASED FILM COMPRISING THE SAME

(71) Applicant: LG CHEM, LTD., Seoul (KR)

(72) Inventors: Duk Hun Jang, Daejeon (KR); Byung Guk Kim, Daejeon (KR); Young Sik Eom, Daejeon (KR); Sung Yeol Choi, Daejeon (KR); Sang Gon Kim, Daejeon (KR); Jin Sook Ryu, Daejeon (KR); Sun Ok Oh, Daejeon (KR); Hyung Sam Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 564 days.

(21) Appl. No.: 16/332,389

(22) PCT Filed: Dec. 13, 2017

(86) PCT No.: PCT/KR2017/014644
§ 371 (c)(1),
(2) Date: Mar. 12, 2019

(87) PCT Pub. No.: WO2018/110973
PCT Pub. Date: Jun. 21, 2018

(65) Prior Publication Data
US 2021/0277235 A1    Sep. 9, 2021

(30) Foreign Application Priority Data

Dec. 15, 2016 (KR) .................. 10-2016-0171844

(51) Int. Cl.
*C08G 73/10* (2006.01)
*C08L 79/08* (2006.01)

(52) U.S. Cl.
CPC .......... *C08L 79/08* (2013.01); *C08G 73/1007* (2013.01); *C08G 73/1039* (2013.01); *C08G 73/1042* (2013.01); *C08G 73/1067* (2013.01); *C08L 2201/10* (2013.01); *C08L 2203/16* (2013.01)

(58) Field of Classification Search
CPC ......... C08G 73/14; C08J 2379/08; C08J 5/18; C08L 79/08; C08L 2203/16
See application file for complete search history.

(56) References Cited

U.S. PATENT DOCUMENTS

| | | | |
|---|---|---|---|
| 3,562,217 A | 2/1971 | Zalewski et al. | |
| 5,162,454 A * | 11/1992 | Pfaendner | C08G 73/14<br>525/432 |
| 2012/0296050 A1 | 11/2012 | Cho et al. | |
| 2014/0031499 A1 * | 1/2014 | Cho | C08G 73/14<br>525/431 |
| 2015/0057426 A1 | 2/2015 | Cho et al. | |
| 2018/0034526 A1 | 2/2018 | Lee et al. | |
| 2019/0010291 A1 | 1/2019 | Choi et al. | |

FOREIGN PATENT DOCUMENTS

| | | |
|---|---|---|
| CA | 2008859 A1 | 8/1990 |
| CN | 108473678 A | 8/2018 |
| EP | 0381621 A2 | 8/1990 |
| EP | 0472421 A2 | 2/1992 |
| EP | 3348598 A1 | 7/2018 |
| EP | 3348599 A1 | 7/2018 |
| EP | 3375806 A | 9/2018 |
| EP | 3412732 A1 | 12/2018 |
| JP | S48-010999 A | 4/1973 |
| JP | H02-233727 A | 9/1990 |
| JP | 2001-181390 A | 7/2001 |
| JP | 2008-045054 A | 2/2008 |
| JP | 2012-241196 A | 12/2012 |
| JP | 2016-196630 A | 11/2016 |
| KR | 10-0688912 B1 | 2/2007 |
| KR | 10-2013-0029129 A | 3/2013 |
| KR | 10-2015-0024110 A | 3/2015 |
| KR | 10-1523730 B1 | 5/2015 |
| KR | 10-2015-0113472 A | 10/2015 |
| KR | 10-2016-0059097 A | 5/2016 |
| KR | 20160059097 * | 5/2016 |
| KR | 10-2016-0082639 A | 7/2016 |
| WO | 2016-148450 A1 | 9/2016 |

OTHER PUBLICATIONS

Search Report issued for European Patent Application No. 17881589.0 dated Sep. 23, 2019, 7 pages.

International Search Report and Written Opinion issued for International Application No. PCT/KR2017/014644 dated Apr. 20, 2018, 12 pages.

C. Liu, et al.; "Synthesis of soluble and autophotosensitive hyperbranched polyimides with good optical properties and thermal properties"; Polymer Journal; (2013); vol. 45; pp. 318-325.

* cited by examiner

*Primary Examiner* — Gregory Listvoyb
(74) *Attorney, Agent, or Firm* — Rothwell, Figg, Ernst & Manbeck, P.C.

(57) ABSTRACT

The present disclosure relates to a polyimide-based block copolymer and a polyimide-based block copolymer film including the same. The polyimide-based block copolymer according to the present disclosure makes it possible to provide a polyimide-based film having low haze and yellow index value while exhibiting excellent transparency.

12 Claims, 1 Drawing Sheet

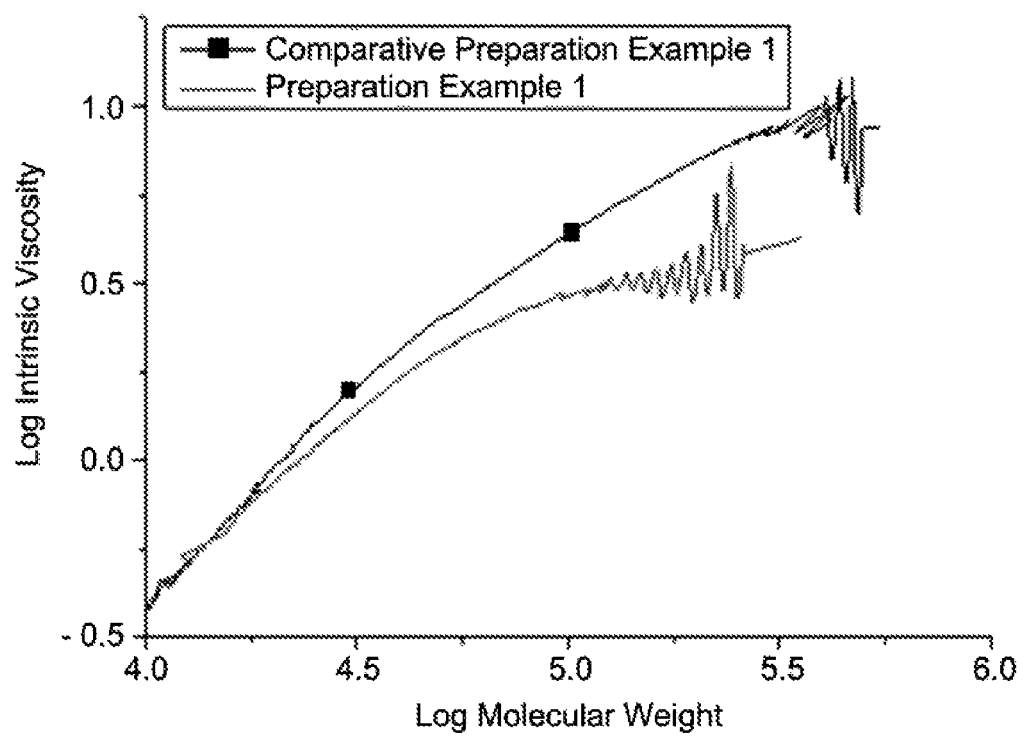

POLYIMIDE-BASED BLOCK COPOLYMER AND POLYIMIDE-BASED FILM COMPRISING THE SAME

TECHNICAL FIELD

Cross-Reference To Related Application

This application is a 35 U.S.C. § 371 National Phase Entry Application from PCT/KR2017/014644, filed on Dec. 13, 2017, and designating the United States, which claims the benefit of Korean Patent Application No. 10-2016-0171844 filed on Dec. 15, 2016 with the Korean Intellectual Property Office, the disclosures of which are incorporated herein by reference in its their entireties.

The present disclosure relates to a polyimide-based block copolymer and a polyimide-based block copolymer film including the same.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used for electric/electronic products.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl ($-CF_3$) group, a method of reducing the formation of the CTC by introducing a sulfone ($-SO_2-$) group, an ether ($-O-$) group, or the like into the main chain to make a bent structure, or a method of inhibiting the formation of the resonance structure of the π electrons by introducing an aliphatic cyclic compound, has been proposed.

However, it is difficult for the polyimide resin according to the proposals to exhibit sufficient heat resistance due to the bending structure or the aliphatic cyclic compound, and a film prepared using the same still has limitations such as poor mechanical properties.

DETAILED DESCRIPTION OF THE INVENTION

Technical Problem

The present disclosure is to provide a polyimide-based block copolymer exhibiting excellent mechanical properties while being colorless and transparent.

The present disclosure is also to provide a polyimide-based film including the same.

Technical Solution

The present disclosure provides a polyimide-based block copolymer including
a first repeating unit represented by Chemical Formula 1 and a second repeating unit represented by Chemical Formula 2,
wherein haze is 3% or less with respect to a specimen having a thickness of 20 μm to 80 μm.

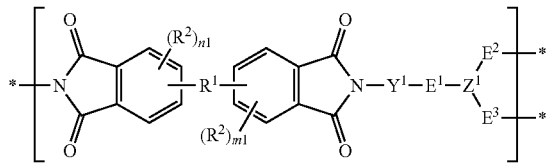
[Chemical Formula 1]

In Chemical Formula 1,
each $R^1$ is the same as or different from each other in each repeating unit, and each is independently a single bond, $-O-$, $-S-$, $-C(=O)-$, $-CH(OH)-$, $-S(=O)_2-$, $-Si(CH_3)_2-$, $-(CH_2)_p-$ (wherein $1 \leq p \leq 10$), $-(CF_2)_q-$ (wherein $1 \leq q \leq 10$), $-C(CH_3)_2-$, $-C(CF_3)_2-$, $-C(=O)NH-$, or a C6 to C30 divalent aromatic organic group;
each $R^2$ is independently $-H$, $-F$, $-Cl$, $-Br$, $-I$, $-CF_3$, $-CCl_3$, $-CBr_3$, $-Cl_3$, $-NO_2$, $-CN$, $-COCH_3$, $-CO_2C_2H_5$, a silyl group containing three C1 to C10 aliphatic organic groups, a C1 to C10 aliphatic organic group, or a C6 to C20 aromatic organic group;
n1 and m1 are independently an integer of 0 to 3;
each $Y^1$ is the same as or different from each other in each repeating unit, and each independently includes a divalent C6 to C30 aromatic organic group, and the aromatic organic group exists alone, or two or more aromatic organic groups are bonded to each other to form a divalent condensed ring, or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein $1 \leq p \leq 10$), $-(CF_2)_q-$ (wherein $1 \leq q \leq 10$), $-C(CH_3)_2-$, $-C(CF_3)_2-$, or $-C(=O)NH-$;
$E^1$, $E^2$, and $E^3$ are independently a single bond or $-NH-$; and
each $Z^1$ is the same as or different from each other in each repeating unit, and each is independently a trivalent linking group derived from at least one compound selected from the group consisting of triacyl halide, tricarboxylic acid, and tricarboxylate.

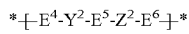
[Chemical Formula 2]

In Chemical Formula 2,
each $Y^2$ is the same as or different from each other in each repeating unit, and each independently includes a C6 to C30 divalent aromatic organic group, and the aromatic organic group exists alone, or two or more aromatic organic groups are bonded to each other to form a divalent condensed ring, or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein $1 \leq p \leq 10$), $-(CF_2)_q-$ (wherein $1 \leq q \leq 10$), $-C(CH_3)_2-$, $-C(CF_3)_2-$, or $-C(=O)NH-$;
$E^4$, $E^5$, and $E^6$ are independently a single bond or $-NH-$; and
each $Z^2$ is the same as or different from each other in each repeating unit, and each is independently a divalent linking group derived from at least one compound selected from the group consisting of diacyl halide, dicarboxylic acid, and dicarboxylate in the form of $-C(=O)-A-C(=O)-$,
wherein A of $Z^2$ is a C6 to C20 divalent aromatic organic group, a C4 to C20 divalent heteroaromatic organic group, or a C6 to C20 divalent alicyclic organic group, and two of $-C(=O)-$ are bonded at a para position with respect to A.

The present disclosure also provides a polyimide-based film including the polyimide-based block copolymer.

Hereinafter, the polyimide-based block copolymer and the polyimide-based film including the same according to the exemplary embodiments of the present disclosure will be described in more detail.

Prior to that, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

I. The Polyimide-Based Block Copolymer

According to one embodiment of the present disclosure, a polyimide-based block copolymer including a first repeating unit represented by Chemical Formula 1 and a second repeating unit represented by Chemical Formula 2 is provided.

[Chemical Formula 1]

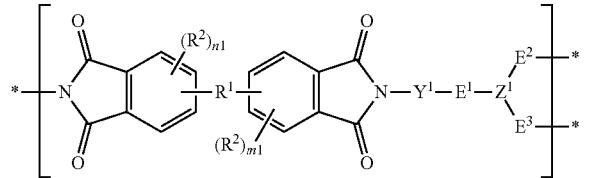

In Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3;

each $Y^1$ is the same as or different from each other in each repeating unit, and each independently includes a divalent C6 to C30 aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^1$, $E^2$, and $E^3$ are independently a single bond or —NH—; and each $Z^1$ is the same as or different from each other in each repeating unit, and each is independently a trivalent linking group derived from at least one compound selected from the group consisting of triacyl halide, tricarboxylic acid, and tricarboxylate.

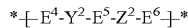 [Chemical Formula 2]

In Chemical Formula 2, each $Y^2$ is the same as or different from each other in each repeating unit, and each independently includes a C6 to C30 divalent aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^4$, $E^5$, and $E^6$ are independently a single bond or —NH—; and each $Z^2$ is the same as or different from each other in each repeating unit, and each is independently a divalent linking group derived from at least one compound selected from the group consisting of diacyl halide, dicarboxylic acid, and dicarboxylate in the form of —C(=O)-A-C(=O)—, wherein A of $Z^2$ is a C6 to C20 divalent aromatic organic group, a C4 to C20 divalent heteroaromatic organic group, or a C6 to C20 divalent alicyclic organic group, and two of —C(=O)— are bonded at a para position with respect to A.

As a result of further studies by the present inventors, it was confirmed that the polyimide-based block copolymer in which a brancher having three reactive substituents is introduced into a linear polyimide chain to be block copolymerized can exhibit excellent mechanical properties while having low haze and being colorless and transparent.

Particularly, the brancher may impart a network structure to the copolymer while preventing the formation of a charge transfer complex between polymer chains. Therefore, the block copolymer including the repeating units containing the brancher may have a network having a rigid and stable structure. Due to this network structure, the polyimide block copolymer exhibits significantly reduced haze and improved transparency as compared with polymers without the brancher.

This polyimide-based block copolymer has haze of 3% or less with respect to a specimen having a thickness of 20 μm to 80 μm. When the haze exceeds 3%, transparency decreases and it is not suitable for a display substrate. Preferably, the haze may be 2.5% or less, 2% or less, or 1.5% or less. Since the lower the haze, the more the colorlessness and transparency, the lower limit thereof is not limited. For example, the lower limit thereof may be 0.01 or more, 0.05 or more, or 0.1 or more.

In addition, the polyimide-based block copolymer may have a degree of branching of 1 to 100, since the brancher having three reactive substituents is introduced thereinto. For example, the copolymer may have the degree of branching of 1 to 50, 1 to 30, or 1 to 10. This is in contrast to the fact that a linear polyimide polymer without a brancher has a degree of branching of 0, and the degree of branching can be measured by a GPC-TDA analysis method.

The polyimide-based block copolymer of the present disclosure includes a first repeating unit represented by Chemical Formula 1 and a second repeating unit represented by Chemical Formula 2.

(i) The First Repeating Unit

[Chemical Formula 1]

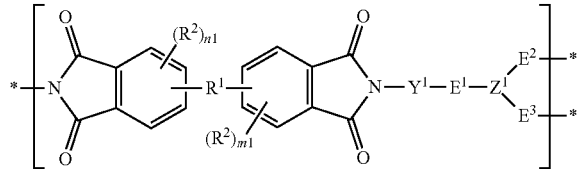

In the first repeating unit of Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$—

(wherein 1≤q≤10), —C(CH$_3$)$_2$—, —C(CF$_3$)$_2$—, —C(=O)NH—, or a C6 to C30 divalent aromatic organic group.

Here, the single bond means a case that R$^1$ in Chemical Formula 1 is a chemical bond which simply links the groups on both sides.

Further, the C6 to C30 aromatic organic group may exist alone; two or more aromatic organic groups may be bonded to each other to form a condensed ring; or two or more aromatic organic groups may be linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Specifically, each R$^1$ is the same as or different from each other in each repeating unit, and each may independently be a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—. More specifically, each R$^1$ is the same as or different from each other in each repeating unit, and each may independently be a single bond or —C(CF$_3$)$_2$—.

Further, each R$^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In addition, the n1 and m1 are independently an integer of 0 to 3. Preferably, the n1 and m1 are independently 0 or 1.

In addition, each Y$^1$ is the same as or different from each other in each repeating unit, and each independently includes a divalent C6 to C30 aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Specifically, Y$^1$ may be a divalent organic group represented by the following structural formula.

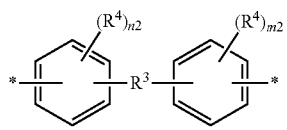

In the structural formula, each R$^3$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each R$^4$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n2 and m2 are independently an integer of 1 to 4.

E$^1$, E$^2$, and E$^3$ are independently a single bond or —NH—. Here, the single bond means a case that E$^1$, E$^2$, and E$^3$ are each a chemical bond which simply links the groups on both sides.

Z$^1$ is a brancher having three reactive substituents, each is the same as or different from each other in each repeating unit, and each is independently a trivalent linking group derived from at least one compound selected from the group consisting of triacyl halide, tricarboxylic acid, and tricarboxylate.

Specifically, Z$^1$ may be the trivalent linking group derived from at least one compound selected from the group consisting of a C6 to C20 aromatic triacyl halide, a C6 to C20 aromatic tricarboxylic acid, a C6 to C20 aromatic tricarboxylate, a C4 to C20 heteroaromatic triacyl halide containing N, a C4 to C20 heteroaromatic tricarboxylic acid containing N, a C4 to C20 heteroaromatic tricarboxylate containing N, a C6 to C20 alicyclic triacyl halide, a C6 to C20 alicyclic tricarboxylic acid, and a C6 to C20 alicyclic tricarboxylate.

More specifically, Z$^1$ may be selected from the group represented by the following structural formulae.

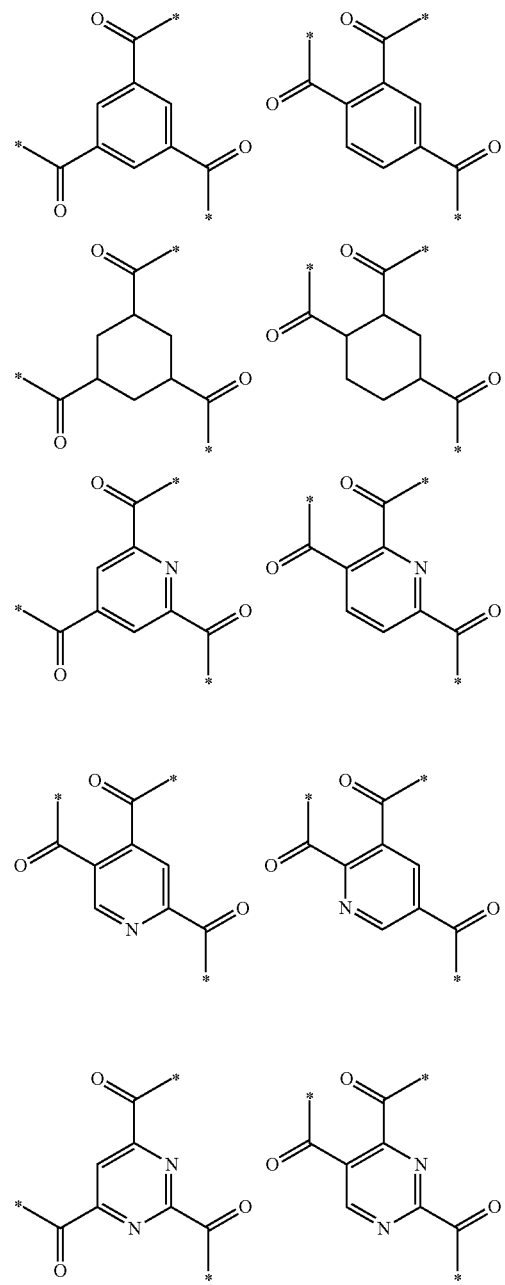

-continued

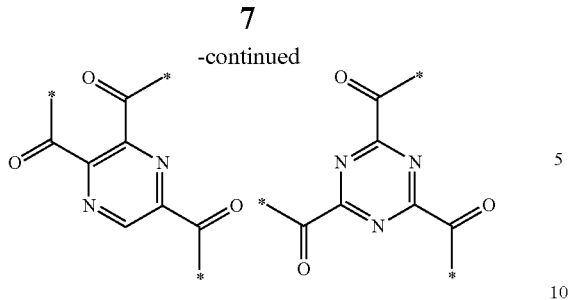

For example, $Z^1$ may be a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

Preferably, the first repeating unit may include a repeating unit represented by Chemical Formula 1-1.

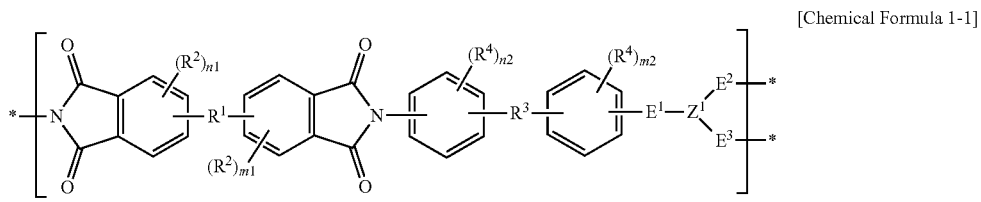

[Chemical Formula 1-1]

In Chemical Formula 1-1, each $R^b$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group; $R^2$ and $R^4$ are independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; each $R^3$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

n1 and m1 are independently an integer of 0 to 3;

n2 and m2 are independently an integer of 1 to 4;

$E^1$, $E^2$, and $E^3$ are independently a single bond or —NH—; and each $Z^1$ is the same as or different from each other in each repeating unit, and each is independently a trivalent linking group derived from at least one compound selected from the group consisting of triacyl halide, tricarboxylic acid, and tricarboxylate.

More specifically, in Chemical Formula 1-1, each $R^1$ is the same as or different from each other in each repeating unit, and each is independently a single bond or —C(CF$_3$)$_2$—; and $Z^1$ is a trivalent linking group derived from at least one compound selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

More preferably, the first repeating unit may include a repeating unit represented by Chemical Formula 1-2 or Chemical Formula 1-3.

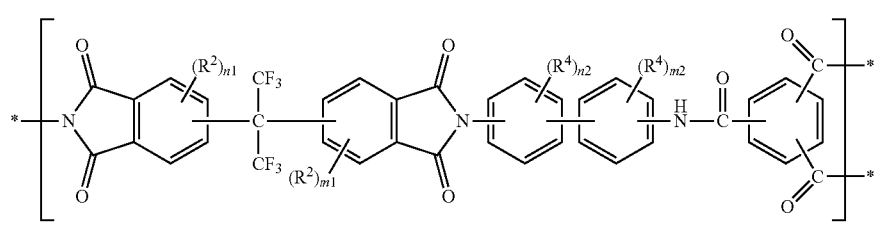

[Chemical Formula 1-2]

[Chemical Formula 1-3]

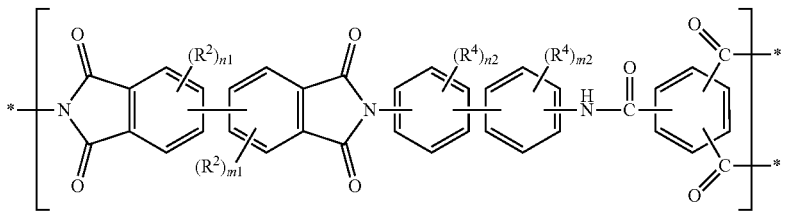

In Chemical Formulae 1-2 and 1-3, $R^2$ and $R^4$ are independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3; and n2 and m2 are independently an integer of 1 to 4.

(ii) The Second Repeating Unit

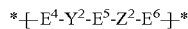      [Chemical Formula 2]

In the second repeating unit of Chemical Formula 2, each $Y^2$ is the same as or different from each other in each repeating unit, and each independently includes a C6 to C30 divalent aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Specifically, $Y^2$ may be the divalent organic group represented by the following structural formula.

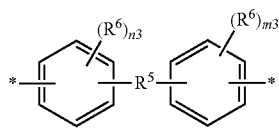

In the structural formula, each $R^5$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^6$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n3 and m3 are independently an integer of 1 to 4.

$E^4$, $E^5$, and $E^6$ are independently a single bond or —NH—. Here, the single bond means a case that $E^4$, $E^5$, and $E^6$ are each a chemical bond which simply links the groups on both sides.

Each $Z^2$ is the same as or different from each other in each repeating unit, and each is independently a divalent linking group derived from at least one compound selected from the group consisting of diacyl halide, dicarboxylic acid, and dicarboxylate in the form of —C(=O)-A-C(=O)—;

wherein A is a C6 to C20 divalent aromatic organic group, a C4 to C20 divalent heteroaromatic organic group, or a C6 to C20 divalent alicyclic organic group, and two of —C(=O)— are bonded at a para position with respect to A.

Specifically, $Z^2$ may be selected from the group represented by the following structural formulae.

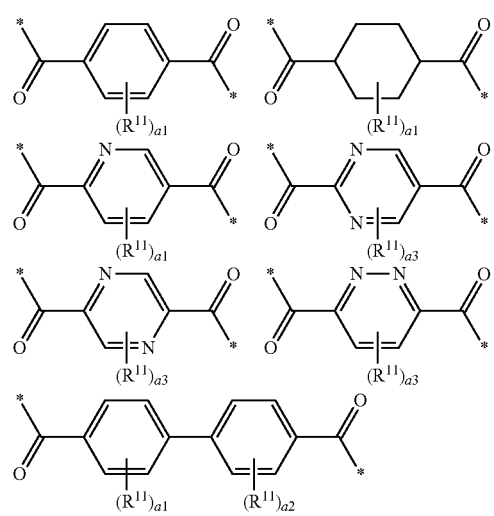

In the structural formulae, $R^{11}$ and $R^{12}$ are independently —H, —F, —Cl, —Br, —I, a silyl group containing three C1 to C10 aliphatic organic groups, a C1 to C10 aliphatic organic group, or a C6 to C20 aromatic organic group;

a1 and a2 are independently an integer of 0 to 3; and a3 is an integer of 0 to 2.

More specifically, $Z^2$ may be selected from the group represented by the following structural formulae.

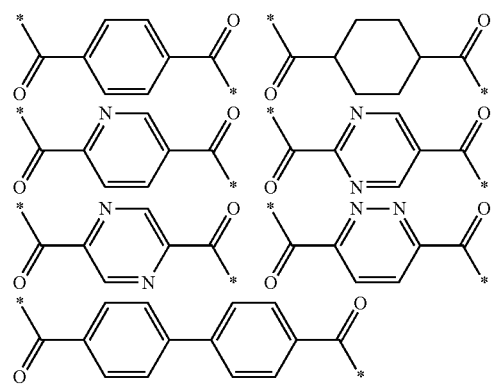

For example, $Z^2$ may independently be a divalent linking group derived from at least one compound selected from the group consisting of terephthaloyl chloride (TPC), terephthalic acid, cyclohexane-1,4-dicarbonyl chloride, cyclohexane-1,4-dicarboxylic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl Chloride (BPC), and 4,4'-biphenyldicarboxylic acid.

Preferably, the second repeating unit may include a repeating unit represented by Chemical Formula 2-1.

[Chemical Formula 2-1]

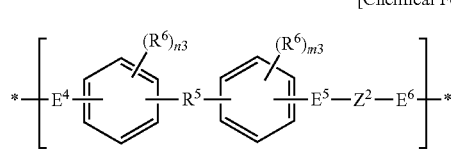

In Chemical Formula 2-1, each $R^5$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—;

each $R^6$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; n3 and m3 are independently an integer of 1 to 4;

$E^4$, $E^5$, and $E^6$ are independently a single bond or —NH—; and each $Z^2$ is the same as or different from each other in each repeating unit, and each is independently selected from the group consisting of the following structural formulae.

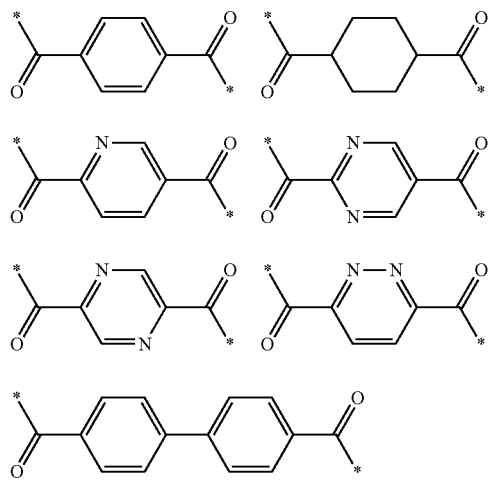

More preferably, the second repeating unit may include a repeating unit represented by Chemical Formula 2-2 or Chemical Formula 2-3.

[Chemical Formula 2-2]

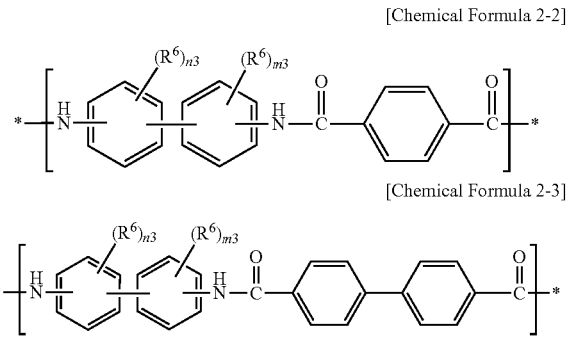

[Chemical Formula 2-3]

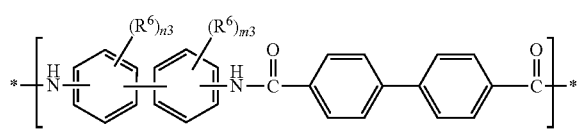

In Chemical Formulae 2-2 and 2-3, each $R^6$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n3 and m3 are independently an integer of 1 to 4.

(iii) The Third Repeating Unit

The polyimide-based block copolymer may further include a third repeating unit represented by Chemical Formula 3, which can improve hardness of the film after the film preparation.

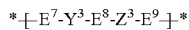   [Chemical Formula 2]

In the third repeating unit of Chemical Formula 3, each $Y^3$ is the same as or different from each other in each repeating unit, and each independently includes a divalent C6 to C30 aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—.

Specifically, $Y^3$ may be a divalent organic group represented by the following structural formula.

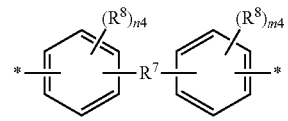

In the structural formula, each $R^7$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—;

each $R^8$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n4 and m4 are independently an integer of 1 to 4.

$E^7$, $E^8$, and $E^9$ are independently a single bond or —NH—. Here, the single bond means a case that $E^7$, $E^8$, and $E^9$ are each a chemical bond which simply links the groups on both sides.

Each $Z^3$ is the same as or different from each other in each repeating unit, and each is independently a divalent linking group derived from at least one compound selected from the group consisting of diacyl halide, dicarboxylic acid, and dicarboxylate in the form of —C(═O)-A'-C(═O)—;

wherein A' of $Z^3$ is a C6 to C20 divalent aromatic organic group, a C4 to C20 divalent heteroaromatic organic group, or a C6 to C20 divalent alicyclic organic group, and two of —C(═O)— are bonded at a meta position with respect to A'.

Specifically, $Z^3$ may be selected from the group represented by the following structural formulae.

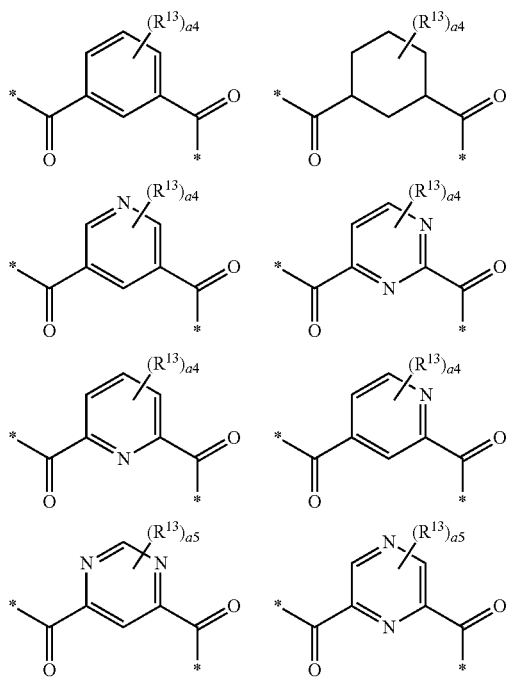

In the structural formulae, $R^{13}$ is —H, —F, —Cl, —Br, —I, a silyl group containing three C1 to C10 aliphatic organic groups, a C1 to C10 aliphatic organic group, or a C6 to C20 aromatic organic group;

a4 is an integer of 0 to 3, and a5 is an integer of 0 to 2.

More specifically, $Z^3$ may be selected from the group represented by the following structural formulae.

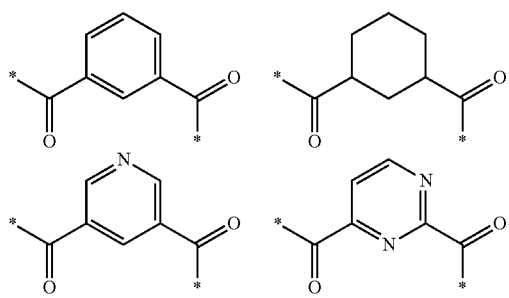

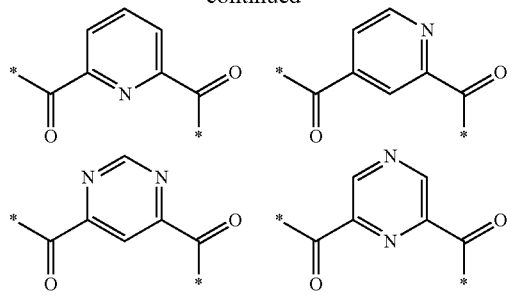

For example, $Z^3$ may independently be a divalent linking group derived from at least one compound selected from the group consisting of isophthaloyl dichloride (IPC), isophthalic acid, cyclohexane-1,3-dicarbonyl chloride, cyclohexane-1,3-dicarboxylic acid, pyridine-3,5-dicarbonyl chloride, pyridine-3,5-dicarboxylic acid, pyrimidine-2,6-dicarbonyl chloride, and pyrimidine-2,6-dicarboxylic acid.

Preferably, the third repeating unit may include a repeating unit represented by Chemical Formula 3-1.

[Chemical Formula 3-1]

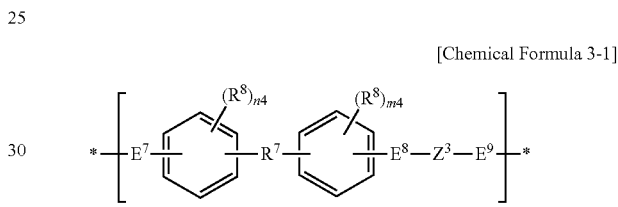

In Chemical Formula 3-1, each $R^7$ is the same as or different from each other in each repeating unit, and each is independently a single bond, a fluorenylene group, —O—, —S—, —C(═O)—, —CH(OH)—, —S(═O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(═O)NH—;

each $R^8$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n4 and m4 are independently an integer of 1 to 4;

$E^7$, $E^8$, and $E^9$ are independently a single bond or —NH—; and each $Z^3$ is the same as or different from each other in each repeating unit, and each is independently selected from the group consisting of the following structural formulae.

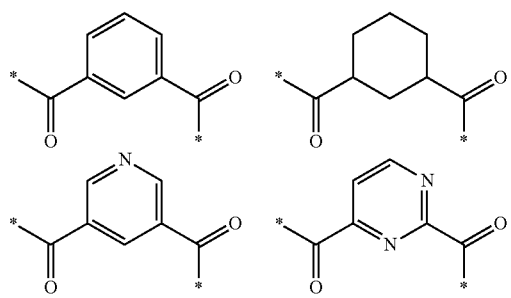

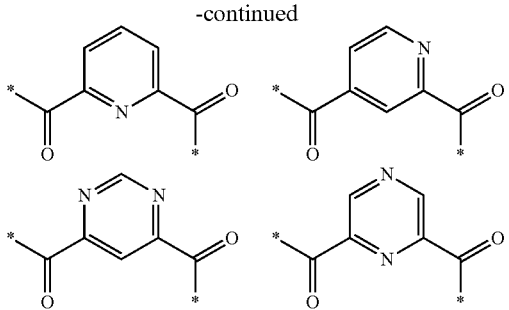

More preferably, the third repeating unit may include a repeating unit represented by Chemical Formula 3-2.

[Chemical Formula 3-2]

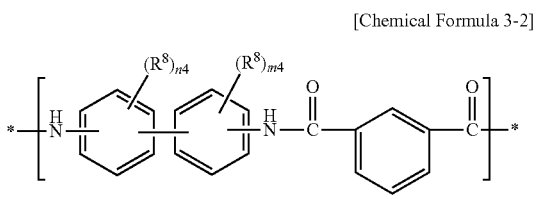

In Chemical Formula 3-2,
each $R^8$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n4 and m4 are independently an integer of 1 to 4.

In the polyimide-based block copolymer, a mole ratio of the first repeating unit to the second repeating unit may be 1:10 to 10:1. For example, the mole ratio of the first repeating unit to the second repeating unit may be 1:5 to 5:1.

The $Z^1$ introduced into the first repeating unit is a brancher that imparts a network structure to the copolymer. By the block copolymerization of the repeating units containing the brancher, a network having a rigid and stable structure may be formed in the copolymer. Therefore, when the weight ratio of the first repeating unit is too low, the network structure is not sufficiently formed in the copolymer, thereby the effect of improving the physical properties may be insignificant. However, if the weight ratio of the first repeating unit is too high, gelation may occur during the polymerization.

In addition, when the polyimide-based block copolymer further includes the third repeating unit, a mole ratio of the first repeating unit to the second repeating unit to the third repeating unit may be 1:0.9:0.1 to 10:0.1:0.9. For example, the mole ratio of the first repeating unit to the second repeating unit to the third repeating unit may be 1:0.2:0.8 to 1:0.8:0.2.

It is more preferable that the polyimide-based block copolymer includes all of the first, the second, and the third repeating units. This is because not only an effect of improving transparency of the prepared film due to the first repeating unit into which the brancher ($Z^1$) is introduced, and an effect of improving processability due to the second repeating unit into which $Z^2$, wherein two of —C(=O)— are bonded at the para position, is introduced, but also an effect of improving hardness of the prepared film due to the third repeating unit into which $Z^3$, wherein two of —C(=O)— are bonded at the meta position, is introduced can be expected.

Further, the polyimide-based block copolymer may have a higher molecular weight than a polyimide resin having a general linear structure, due to a strong and stable network structure. Specifically, the polyimide-based block copolymer may have a weight average molecular weight of 100,000 to 1,000,000 g/mol, and preferably 200,000 to 800,000 g/mol.

In addition, the polyimide-based copolymer may have a yellow index of 2.5 or less with respect to a specimen having a thickness of 20 μm to 80 μm. More preferably, the yellow index may be 2.4 or less, 2.3 or less, or 2.25 or less. Since the lower the yellow index, the more the colorlessness and transparency, the lower limit thereof is not limited. For example, the lower limit thereof may be 0.01 or more, 0.05 or more, or 0.1 or more.

The polyimide-based block copolymer may be prepared by a method including the steps of: mixing a compound forming the first repeating unit in an appropriate solvent to initiate a reaction; adding a compound forming the second repeating unit to the reaction mixture and reacting; and adding a compound such as acetic anhydride or pyridine to the reaction mixture to induce a chemical imidization reaction.

In addition, when the polyimide-based block copolymer further includes the third repeating unit, it may be prepared by a method including the steps of: mixing a compound forming the first repeating unit in an appropriate solvent to initiate a reaction; adding a compound forming the second repeating unit to the reaction mixture and reacting; adding a compound forming the third repeating unit to the reaction mixture and reacting; and adding a compound such as acetic anhydride or pyridine to the reaction mixture to induce a chemical imidization reaction.

The polyimide-based block copolymer may be prepared by low-temperature solution polymerization, interfacial polymerization, melt polymerization, solid phase polymerization, or the like.

II. The Polyimide-Based Film

According to another embodiment of the present disclosure, a polyimide-based film including the polyimide-based block copolymer is provided.

As described above, as a result of further studies by the present inventors, it was confirmed that the polyimide-based block copolymer in which a brancher having three reactive substituents is introduced into a linear polyimide chain to be block copolymerized can exhibit excellent mechanical properties while being colorless and transparent.

As a result, the polyimide-based film including the polyimide-based block copolymer can be suitably used as a base material for various molded articles requiring colorless transparency as well as excellent mechanical properties. For example, the polyimide-based film can be applied to substrates for displays, protective films for displays, touch panels, and the like.

The polyimide-based film may be prepared by a conventional method such as a dry method or a wet method using the polyimide-based block copolymer. For example, the polyimide-based film may be obtained by coating a solution containing the copolymer on an arbitrary support to form a film, and drying the film by evaporating the solvent from the film. If necessary, stretching and heat treatment for the polyimide-based film may be carried out.

Advantageous Effects

The polyimide-based block copolymer according to the present disclosure makes it possible to provide a polyimide-based film having low haze and yellow index while exhibiting excellent transparency.

BRIEF DESCRIPTION OF THE DRAWING

FIG. 1 is a graph showing a Mark-Houwink plot for the polyimide-based copolymer according to Preparation Example 1 and Comparative Preparation Example 1.

DETAILED DESCRIPTION OF THE EMBODIMENTS

Hereinafter, preferred examples are provided for better understanding. However, these examples are for illustrative purposes only, and the invention is not intended to be limited by these examples.

Preparation Example 1

In a 250 mL round flask equipped with a Dean-Stark apparatus and a condenser, 1.01 eq. of 2,2'-bis(trifluoromethyl)benzidine (TMFB), 0.9825 eq. of 4,4'-(hexafluoroisopropylidene) diphthalic anhydride (FDA), and 0.005 eq. of benzene 1,3,5-tricarbonyl trichloride (TMC) were added to 60 ml of anhydrous dimethylacetamide (14 wt %), and the reaction was initiated at room temperature. The reaction mixture was stirred at 0° C. for 4 hours with ice water under a nitrogen atmosphere.

After the reaction product was taken out and returned to room temperature, 1.01 eq. of terephthaloyl chloride (TPC) and 120 ml of additional dimethylacetamide were added thereto, followed by stirring for 4 hours.

After forming the polyamic acid polymer by the reaction, 10 eq. of acetic anhydride and 10 eq. of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the following first and second repeating units with a mole ratio of 1:1 (a weight average molecular weight of about 400,000 g/mol).

[The First Repeating Unit]

[The Second Repeating Unit]

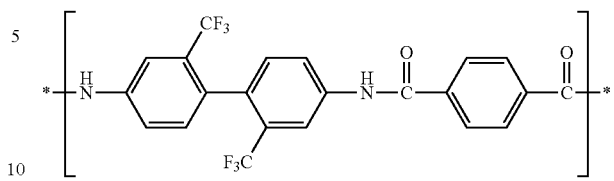

$^1$H NMR (DMSO-d6, TMS as standard material) δ (ppm): 10.815(s), 8.378(s), 8.253(d), 8.168(d), 8.033(s), 8.001(d), 7.841(d), 7.792(s), 7.789(d)

Preparation Example 2

In a 250 mL round flask equipped with a Dean-Stark apparatus and a condenser, 1.01 eq. of 2,2'-bis(trifluoromethyl)benzidine (TMFB), 0.99 eq. of 4,4'-(hexafluoroisopropylidene) diphthalic anhydride (FDA), and 0.005 eq. of benzene 1,3,5-tricarbonyl trichloride (TMC) were added to 60 ml of anhydrous dimethylacetamide (14 wt %), and the reaction was initiated at room temperature. The reaction mixture was stirred at 0° C. for 4 hours with ice water under a nitrogen atmosphere.

After the reaction product was taken out and returned to room temperature, 0.7 eq. of 4,4'-biphenyldicarbonyl chloride (BPC) and 60 ml of additional dimethylacetamide were added thereto, followed by stirring for 4 hours.

After the reaction product was taken out and returned to room temperature, 0.3 eq. of isophthaloyl dichloride (IPC) and 60 ml of additional dimethylacetamide were added thereto, followed by stirring for 4 hours.

After forming the polyamic acid polymer by the reaction, 10 eq. of acetic anhydride and 10 eq. of pyridine were added to the reaction mixture, and the mixture was stirred in an oil bath at 40° C. for 15 hours to carry out the chemical imidization reaction.

After completion of the reaction, the mixture was precipitated with water and ethanol to obtain a polyimide-based block copolymer having the following first, second, and third repeating units with a mole ratio of 1:0.7:0.3 (a weight average molecular weight of about 400,000 g/mol).

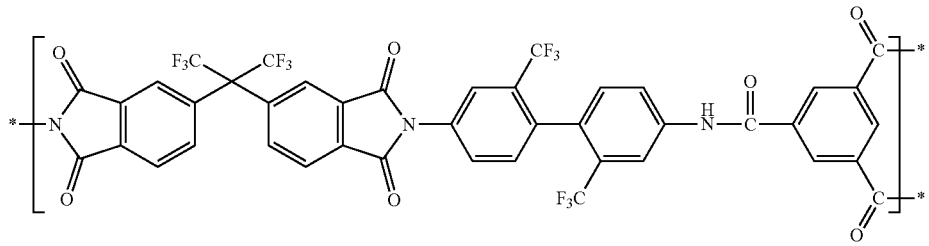

[The First Repeating Unit]

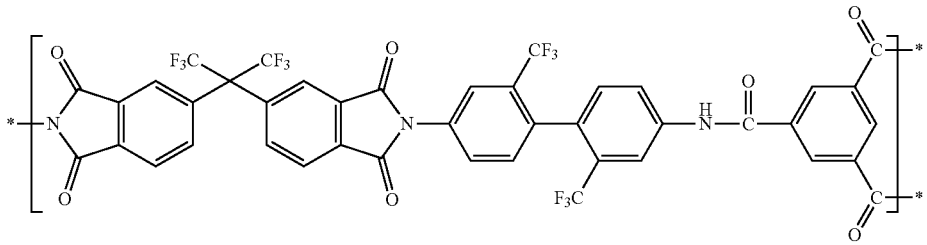

[The Second Repeating Unit]

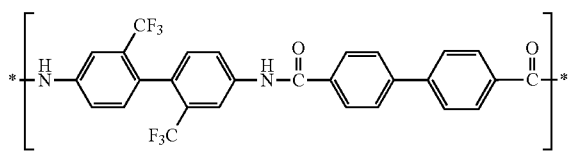

[The Third Repeating Unit]

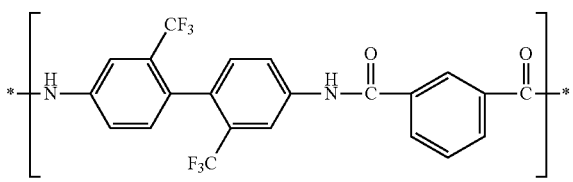

$^1$H NMR (DMSO-d6, TMS as standard material) δ (ppm): 10.794(d), 8.539(s), 8.394(d), 8.263(s), 8.159(s), 8.014(s), 7.805(s), 7.710(s), 7.424(m)

Comparative Preparation Example 1

A polyimide-based polymer (a weight average molecular weight of about 400,000 g/mol) was obtained in the same manner as in Example 1, except that benzene 1,3,5-tricarbonyl trichloride (TMC) was not used.

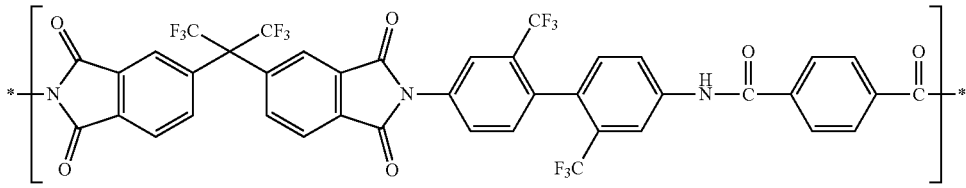

Experimental Example 1

The degree of branching was evaluated for the polyimide-based polymers of the Example 1, Example 2, and Comparative Example 1 by the following method, and the results are shown in Table 1.

Specifically, the polyimide-based polymer was dissolved in a dimethylformamide (DMF) solvent, and the degree of branching was measured using a Viscotek TDA detector and a PL mixed Bx2 column at 65° C. at a flow rate of 1.0 ml/min, a sample concentration of 1 mg/ml or less, and an injection volume of 100 μl.

In addition, the Mark-Houwink plot (Log M vs. Log intrinsic viscosity; Method ab_PI2-0000.vcm) was measured using Liquid Chromatography-Triple Quadrupole Mass Spectrometry (LC-QqQ) for each of the polyimide-based polymers prepared in Preparation Example 1 and Comparative Preparation Example 1, and the results are shown in FIG. 1.

The Mark-Houwink plot is measured based on the Mark-Houwink equation ($[\eta]=K*M^a$; wherein $[\eta]$ is an intrinsic viscosity of the polymer solution, M is a viscosity average molecular weight of the polymer, and K and a are Mark-Houwink parameters depending on the polymer and solvent).

Referring to FIG. 1, linear polymers like Comparative Preparation Example 1 have high intrinsic viscosity, since the polymer chain is large in size and is dense. On the other hand, the polymer according to Preparation Example 1 has relatively low density and low intrinsic viscosity, since a brancher having three reactive substituents was applied.

Example 1

The polyimide-based copolymer obtained in Preparation Example 1 was dissolved in dimethylacetamide to prepare a polymer solution of about 15% (w/V). The polymer solution was poured on a glass plate, the thickness of the polymer solution was uniformly adjusted using a film applicator, and was dried in a vacuum oven at 100° C. for 12 hours or more to obtain a polyimide-based film having a thickness of 30 μm.

Example 2

A film having a thickness of 30 μm was obtained in the same manner as in Example 1, except that the polyimide-based copolymer obtained in Preparation Example 2 was used in place of the copolymer obtained in Preparation Example 1.

Comparative Example 1

A film having a thickness of 30 μm was obtained in the same manner as in Example 1, except that the polyimide-based copolymer obtained in Comparative Preparation Example 1 was used in place of the copolymer obtained in Preparation Example 1.

Experimental Example 2

The following properties were evaluated for the films of the Example 1, Example 2, and Comparative Example 1 by the following methods, and the results are shown in Table 1.

1) Yellow index (YI): The yellow index (YI) of the film was measured according to the method of ASTM D1925 using a COH-400 Spectrophotometer (NIPPON DENSHOKU INDUSTRIES).

2) Haze: The haze of the film was measured according to the method of ASTM D1003 using a COH-400 Spectrophotometer (NIPPON DENSHOKU INDUSTRIES).

TABLE 1

|  | Example 1 | Example 2 | Comparative Example 1 |
| --- | --- | --- | --- |
| Polyimide copolymer | Prep. Ex. 1 | Prep. Ex. 2 | Comp. Prep. Ex. 1 |
| Monomers used | FDA, TMFB, TMC, TPC | FDA, TMFB, TMC, IPC, BPC | FDA, TMFB, TPC |
| Degree of branching | 5.5 | — | 0 |
| Yellow index (YI) | 2.21 | 2.3 | 2.86 |
| Haze (%) | 1.27 | 0.8 | 3.37 |

Referring to Table 1, it was confirmed that the films according to the examples exhibit significantly low haze and yellow index as compared with the film of the comparative example.

The invention claimed is:

1. A polyimide-based block copolymer including
a first repeating unit represented by Chemical Formula 1 and a second repeating unit represented by Chemical Formula 2,
wherein the copolymer has properties such that, when incorporated in a film having a thickness of 20 μm all to 80 μm, the film has 3% or less haze, and
wherein the copolymer has a degree of branching of 1 to 100:

[Chemical Formula 1]

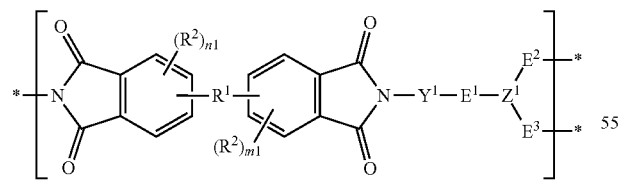

in Chemical Formula 1,
each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

each $R^2$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3;

each $Y^1$ is the same as or different from each other in each repeating unit, and each independently comprises a divalent C6 to C30 aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—;

$E^1$, $E^2$, and $E^3$ are independently a single bond or —NH—; and each $Z^1$ is the same as or different from each other in each repeating unit, and each is independently a trivalent linking group derived from at least one compound selected from the group consisting of triacyl halide, tricarboxylic acid, and tricarboxylate,

[Chemical Formula 2]

*—[—E$^4$-Y$^2$-E$^5$-Z$^2$-E$^6$—]—* in Chemical Formula 2,
each $Y^2$ is the same as or different from each other in each repeating unit, and each independently comprises a C6 to C30 divalent aromatic organic group, and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—;

$E^4$, $E^5$, and $E^6$ are independently a single bond or —NH—; and each $Z^2$ is the same as or different from each other in each repeating unit, and each is independently a divalent linking group derived from at least one compound selected from the group consisting of diacyl halide, dicarboxylic acid, and dicarboxylate in the form of —C(=O)-A-C(=O)—, wherein A of $Z^2$ is a C6 to C20 divalent aromatic organic group, a C4 to C20 divalent heteroaromatic organic group, or a C6 to C20 divalent alicyclic organic group, and two of —C(=O)— are bonded at a para position with respect to A.

2. The polyimide-based block copolymer of claim 1, wherein the first repeating unit comprises a repeating unit represented by Chemical Formula 1-1:

[Chemical Formula 1-1]

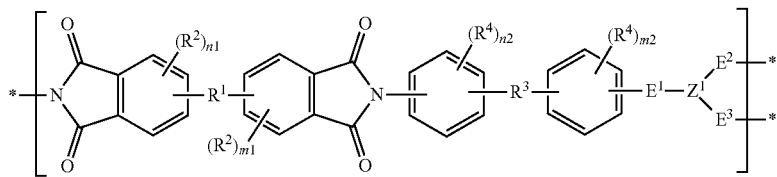

in Chemical Formula 1-1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

$R^2$ and $R^4$ are independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

each $R^3$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

n1 and m1 are independently an integer of 0 to 3;

n2 and m2 are independently an integer of 1 to 4;

$E^1$, $E^2$, and $E^3$ are independently a single bond or —NH—; and each $Z^1$ is the same as or different from each other in each repeating unit, and each is independently a trivalent linking group derived from at least one compound selected from the group consisting of triacyl halide, tricarboxylic acid, and tricarboxylate.

3. The polyimide-based block copolymer of claim 2, wherein in Chemical Formula 1-1, each $R^1$ is the same as or different from each other in each repeating unit, and each is independently a single bond or —C(CF$_3$)$_2$—; and $Z^1$ is a trivalent linking group derived from at least one compound selected from the group consisting of 1,3, 5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

4. The polyimide-based block copolymer of claim 1, wherein the first repeating unit comprises a repeating unit represented by Chemical Formula 1-2 or Chemical Formula 1-3:

[Chemical Formula 1-2]

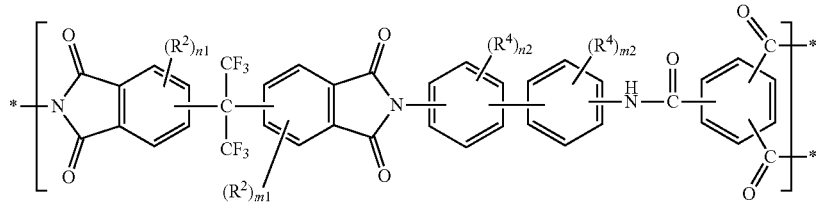

[Chemical Formula 1-3]

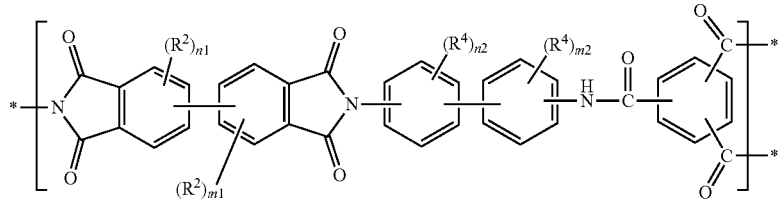

in Chemical Formulae 1-2 and 1-3, $R^2$ and $R^4$ are independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are independently an integer of 0 to 3; and n2 and m2 are independently an integer of 1 to 4.

5. The polyimide-based block copolymer of claim 1, wherein the second repeating unit comprises a repeating unit represented by Chemical Formula 2-1:

[Chemical Formula 2-1]

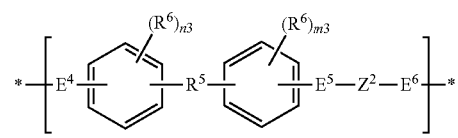

in Chemical Formula 2-1, each $R^5$ is the same as or different from each other in each repeating unit, and each is independently a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^6$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n3 and m3 are independently an integer of 1 to 4;

$E^4$, $E^5$, and $E^6$ are independently a single bond or —NH—; and each $Z^2$ is the same as or different from each other in each repeating unit, and each is independently selected from the group consisting of the following structural formulae:

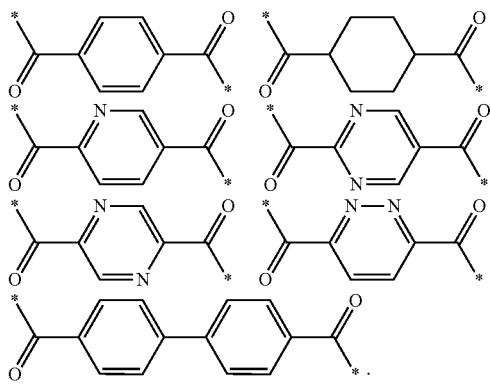

6. The polyimide-based block copolymer of claim 1, wherein the second repeating unit comprises a repeating unit represented by Chemical Formula 2-2 or Chemical Formula 2-3:

[Chemical Formula 2-2]

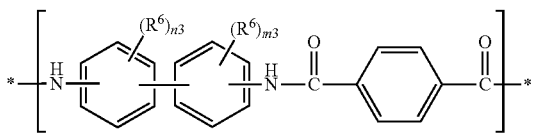

[Chemical Formula 2-3]

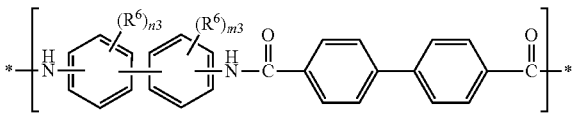

in Chemical Formulae 2-2 and 2-3, each $R^6$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group; and n3 and m3 are independently an integer of 1 to 4.

7. The polyimide-based block copolymer of claim 1, wherein a mole ratio of the first repeating unit to the second repeating unit is 1:10 to 10:1.

8. The polyimide-based block copolymer of claim 1, wherein a weight average molecular weight is 100,000 to 1,000,000 g/mol.

9. The polyimide-based block copolymer of claim 1, wherein the copolymer has a degree of branching of 1 to 50.

10. The polyimide-based block copolymer of claim 1, wherein the copolymer has properties such that, when incorporated in a film having a thickness of 20 μm to 80 μm, the film has a yellow index of 2.5 or less, as measured in accordance with ASTM D1925.

11. A polyimide-based film comprising the polyimide-based block copolymer of claim 1, wherein the film has 3% or less haze as measured in a film specimen having a thickness of 20 μm to 80 μm.

12. A polyimide-based film comprising the polyimide-based block copolymer of claim 1, wherein the film has a yellow index of 2.5 or less as measured in a film specimen having a thickness of 20 μm to 80 μm in accordance with ASTM D1925.

* * * * *